(12) United States Patent
Noma et al.

(10) Patent No.: US 9,864,926 B2
(45) Date of Patent: Jan. 9, 2018

(54) SEARCH METHOD, SEARCH PROGRAM, AND SEARCH DEVICE

(71) Applicant: FUJITSU LIMITED, Kawasaki-shi, Kanagawa (JP)

(72) Inventors: Yui Noma, Kawasaki (JP); Makiko Konoshima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 428 days.

(21) Appl. No.: 14/546,456

(22) Filed: Nov. 18, 2014

(65) Prior Publication Data

US 2015/0178590 A1    Jun. 25, 2015

(30) Foreign Application Priority Data

Dec. 19, 2013    (JP) .................. 2013-263025

(51) Int. Cl.
*G06K 9/52* (2006.01)
*G06K 9/00* (2006.01)
(Continued)

(52) U.S. Cl.
CPC ........... *G06K 9/52* (2013.01); *G06K 9/00885* (2013.01); *G06K 9/6214* (2013.01); *G06K 9/6215* (2013.01); *G06N 7/005* (2013.01); *H04L 9/0643* (2013.01); *H04L 9/3231* (2013.01); *G06N 99/005* (2013.01)

(58) Field of Classification Search
CPC ............... G06K 9/6215; G06K 9/6214; G06K 9/00885; G06K 9/52; G06N 7/005; H04L 9/3231; H04L 9/0643
See application file for complete search history.

(56) References Cited

U.S. PATENT DOCUMENTS 5,920,644 A    7/1999   Fujimoto et al.
6,005,984 A * 12/1999  Kawakami ........... G06K 9/4619
                                                      382/276
(Continued)

FOREIGN PATENT DOCUMENTS

JP    2011-39755     2/2011
JP    2011-100395    5/2011
JP    2012-160047    8/2012

OTHER PUBLICATIONS

"Spherical Hashing" Heo, Jae-Pil; Lee, Youngwoon; He, Junfeng; Chang, Shih-Fu; Yoon, Sung-Eui; Columbia University, 2012, pp. 2957-2964.
(Continued)

*Primary Examiner* — Chan Park
*Assistant Examiner* — Mia M Thomas
(74) *Attorney, Agent, or Firm* — Staas & Halsey LLP

(57) ABSTRACT

A search device according to an embodiment maps a feature vector onto a hyper-sphere on the basis of parameters which include an intersection and a distance, with the intersection at which an m-dimensional feature space and a straight line passing through the hyper-sphere present in a space greater in dimension than m intersect and the distance being from the north pole of the hyper-sphere to the feature space. In this case, the search device searches for the parameters which allow the positions of feature vectors mapped onto the hyper-sphere to be concentrated on a predetermined hemisphere of the hyper-sphere.

16 Claims, 14 Drawing Sheets

(51) Int. Cl.
*G06K 9/62* (2006.01)
*H04L 9/06* (2006.01)
*H04L 9/32* (2006.01)
*G06N 7/00* (2006.01)
*G06N 99/00* (2010.01)

(56) References Cited

U.S. PATENT DOCUMENTS

| | | | | |
|---|---|---|---|---|
| 6,120,461 | A * | 9/2000 | Smyth | A61B 3/113 |
| | | | | 348/E13.041 |
| 7,076,117 | B2 * | 7/2006 | Biermann | G06T 17/20 |
| | | | | 382/285 |
| 9,031,882 | B2 * | 5/2015 | Kanda | G06K 9/6269 |
| | | | | 706/12 |
| 9,582,731 | B1 * | 2/2017 | Butko | G06K 9/4609 |
| 9,609,212 | B2 * | 3/2017 | Takenaka | H04N 5/23238 |
| 2002/0006221 | A1 * | 1/2002 | Shin | G06T 7/41 |
| | | | | 382/181 |
| 2002/0191863 | A1 * | 12/2002 | Biermann | G06T 7/80 |
| | | | | 382/284 |
| 2003/0095720 | A1 * | 5/2003 | Chiu | H04N 5/262 |
| | | | | 382/284 |
| 2003/0223627 | A1 * | 12/2003 | Yoshida | G06T 7/0012 |
| | | | | 382/128 |
| 2007/0040907 | A1 * | 2/2007 | Kern | A61B 5/0059 |
| | | | | 348/77 |
| 2007/0217681 | A1 * | 9/2007 | Potke | G06K 9/4647 |
| | | | | 382/190 |
| 2007/0276853 | A1 * | 11/2007 | Hamza | G06F 17/30312 |
| 2009/0002366 | A1 * | 1/2009 | Kanitsar | A61B 6/032 |
| | | | | 345/419 |
| 2009/0028403 | A1 * | 1/2009 | Bar-Aviv | G06F 19/321 |
| | | | | 382/128 |
| 2009/0083228 | A1 * | 3/2009 | Shatz | G06F 17/30743 |
| 2009/0185746 | A1 * | 7/2009 | Mian | G06K 9/00201 |
| | | | | 382/209 |
| 2009/0324060 | A1 * | 12/2009 | Sato | G06K 9/00228 |
| | | | | 382/159 |
| 2010/0063784 | A1 * | 3/2010 | Chang | G06T 17/00 |
| | | | | 703/2 |
| 2010/0205177 | A1 * | 8/2010 | Sato | G06K 9/00281 |
| | | | | 707/737 |
| 2012/0233841 | A1 * | 9/2012 | Stein | G03B 17/02 |
| | | | | 29/428 |
| 2013/0271578 | A1 * | 10/2013 | Richards | G06T 5/006 |
| | | | | 348/47 |
| 2014/0079297 | A1 * | 3/2014 | Tadayon | G06K 9/00 |
| | | | | 382/118 |
| 2015/0170402 | A1 * | 6/2015 | Noma | G06T 15/10 |
| | | | | 345/419 |

OTHER PUBLICATIONS

"Spherical LSH for Approximate Nearest Neighbor Search on Unit Hypersphere", In Frank K. H. A. Dehne, jorg-Rudiger Sack, and Norbert Zeh, editors, WADS, vol. 4619 of Lecture Notes in Computer Science, 2007, pp. 27-38.
Chinese Office Action dated Jul. 11, 2017 in corresponding Chinese Patent Application No. 201410697191.1.
Korean Office Action dated Feb. 5, 2016 in corresponding Korean Patent Application No. 10-2014-0167484.
Extended European Search Report dated Jun. 2, 2015 in corresponding European Patent Application No. 14193218.6.
Terasawa et al., "Approximate Nearest Neighbor Search for a Dataset of Normalized Vectors", IEICE Transactions on Information and Systems, vol. E92-D, No. 9, Sep. 2009, pp. 1609-1619.
Noma et al., "Eclipse Hashing: Alexandrov Compactification and Hashing with Hyperspheres for Fast Similarity Search", Jun. 2014, pp. 1-10 <http://arxiv.org/abs/1406.3882>.

* cited by examiner

FIG.2A

| IDENTIFICATION INFORMATION | FEATURE VECTOR |
|---|---|
| 1001 | $(A_1, A_2, \cdots, A_m)$ |
| 1002 | $(B_1, B_2, \cdots, B_m)$ |
| ... | |

FIG.2B

| IDENTIFICATION INFORMATION | BIT STRING |
|---|---|
| 1001 | 10001010101··· |
| 1002 | 00001110101··· |
| ... | |

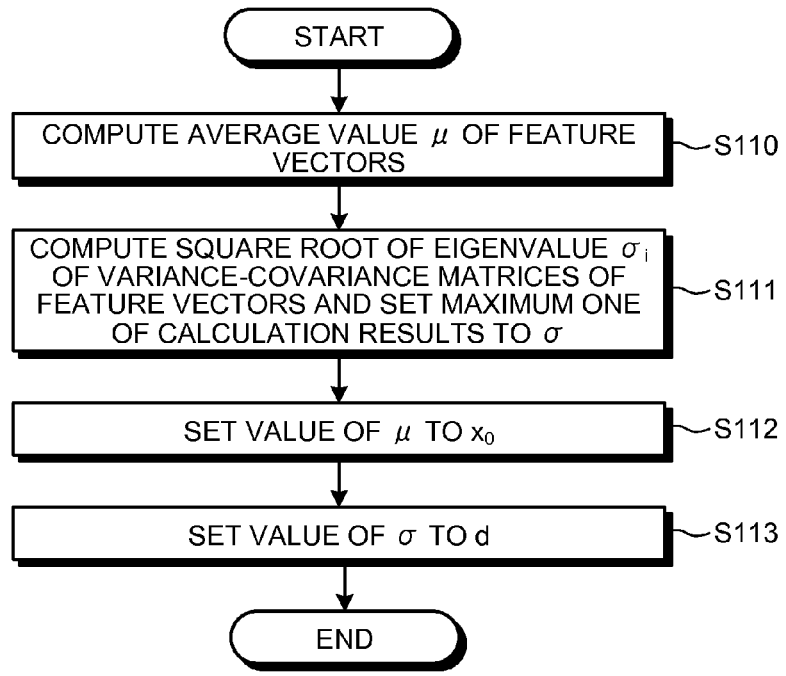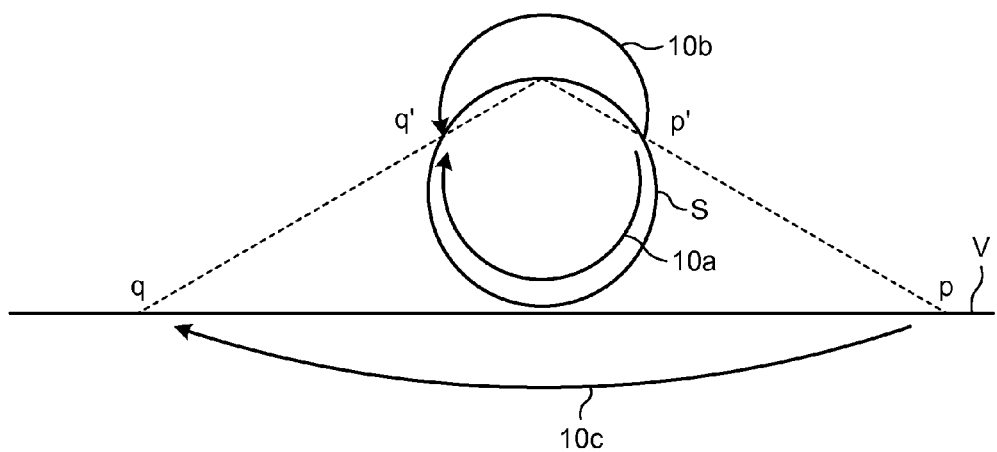

SEARCH METHOD, SEARCH PROGRAM, AND SEARCH DEVICE

CROSS-REFERENCE TO RELATED APPLICATION(S)

This application is based upon and claims the benefit of priority of the prior Japanese Patent Application No. 2013-263025, filed on Dec. 19, 2013, the entire contents of which are incorporated herein by reference.

FIELD

The embodiments discussed herein are directed to a search method, etc.

BACKGROUND

For example, to authenticate users of various systems, users' biometric information is acquired, and then it is determined whether the biometric information that matches the acquired biometric information has been pre-registered with and is found in a database. Here, the similarity search can be effectively performed because the biometric information to be acquired at the time of authentication rarely perfectly matches the biometric information acquired at the time of registration.

To express the similarity level for performing the similarity search, there is available a technique for converting the feature values of biometric information into a hash vector. The technique identifies, as similar biometric information, each of pieces of biometric information that have hash vectors of close hamming distances.

Conventional techniques have employed a hyper-plane to convert feature values into a hash vector. However, there is also available a technique for employing a hyper-sphere to convert feature values into a hash vector, and it is expected that the technique using the hyper-sphere implements an improvement in accuracy.

CITATION LIST

Patent Literature

Patent Literature 1: Japanese Laid-open Patent Publication No. 2011-100395
Patent Literature 2: Japanese Laid-open Patent Publication No. 2012-160047
Patent Literature 3: Japanese Laid-open Patent Publication No. 2011-39755

Non-Patent Literature

Non-Patent Literature 1: Jae-Pil Heo, Youngwoon Lee, Junfeng He, Shih-Fu Chang, and Sung-Eui Yoon. "Spherical hashing", in CVPR, pp. 2957-2964, 2012.
Non-Patent Literature 2: Kengo Terasawa and Yuzuru Tanaka. "Spherical lsh for approximate nearest neighbor search on unit hyper-sphere", in Frank K. H. A. Dehne, Jorg-Rudiger Sack, and Norbert Zeh, editors, WADS, Vol. 4619 of Lecture Notes in Computer Science, pp. 27-38. Springer, 2007.

However, the aforementioned conventional technique raises the problem that computing the hash vector using the hyper-sphere would lead to increases in the amount of computation.

Furthermore, when the feature vector is converted into the hash vector using the hyper-sphere, a wormhole may cause even significantly different feature vectors to have a shortened hamming distance after the conversion into the hash vector. For this reason, those different feature vectors may be erroneously determined as similar feature vectors.

SUMMARY

According to an aspect of an embodiment, a search method includes acquiring a first-dimensional feature vector stored in a database; and searching for parameters by which a position of the feature vector to be mapped onto a surface of a sphere is concentrated onto a hemisphere of the sphere when the feature vector is mapped onto the surface of the sphere on the basis of the parameters including an intersection and a distance, the intersection at which a feature space and a straight line passing through the sphere present in a space greater in dimension by one or more than the feature space intersect, the distance being from a predetermined point of the sphere to the feature space.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A is a view illustrating an example data structure of a feature value storage unit.
FIG. 2B is a view illustrating an example data structure of a bit string storage unit.
FIG. 6 is a flow chart illustrating the procedure of a parameter identifying process according to the first embodiment.
FIG. 7 is an explanatory view illustrating a shortcut around a point at infinity.

DESCRIPTION OF EMBODIMENTS

Preferred embodiments of the present invention will be explained with reference to accompanying drawings. Note that the present invention is not to be limited by these embodiments.

[a] First Embodiment

Figure 1:
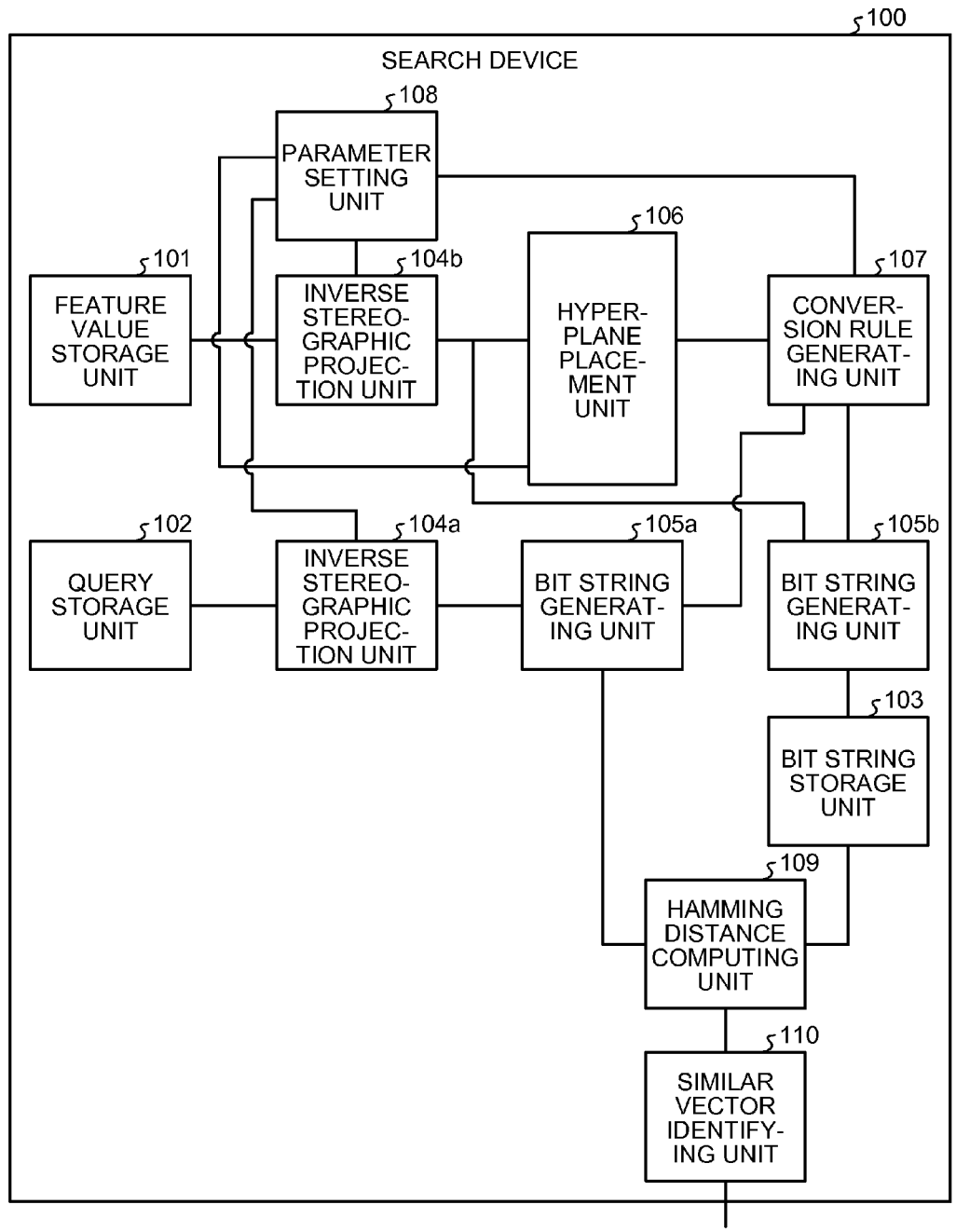
FIG. 1 is a functional block diagram illustrating a configuration of a search device according to a first embodiment.

A description will be made to an example of a configuration of a search device according to a first embodiment. FIG. 1 is a functional block diagram illustrating the configuration of the search device according to the first embodiment. As illustrated in FIG. 1, a search device 100 includes a feature value storage unit 101, a query storage unit 102, a bit string storage unit 103, inverse stereographic projection units 104a and 104b, and bit string generating units 105a and 105b. The search device 100 also includes a hyper-plane placement unit 106, a conversion rule generating unit 107, a parameter setting unit 108, a hamming distance computing unit 109, and a similar vector identifying unit 110.

The feature value storage unit 101 stores a plurality of feature vectors. FIG. 2A is a view illustrating an example data structure of the feature value storage unit. As illustrated in FIG. 2A, the feature value storage unit 101 stores identification information and a feature vector by associating one with the other. The identification information uniquely identifies the feature vector. The feature vector is, for example, m-dimensional feature value data that is obtained from user's biometric information. To determine the feature vector from the biometric information, any conventional technique may be employed.

The query storage unit 102 stores feature vectors for a query. The search device 100 searches the feature value storage unit 101 for a feature vector similar to a query feature vector.

The bit string storage unit 103 stores bit strings acquired from a bit string generating unit 105 to be described later. FIG. 2B is a view illustrating an example data structure of the bit string storage unit. As illustrated in FIG. 2B, the bit string storage unit 103 stores the identification information and the bit string by associating one with the other. The identification information uniquely identifies the feature vector from which the bit string has been generated. The bit string is generated on the basis of the feature vector.

The inverse stereographic projection units 104a and 104b map an m-dimensional feature space V by inverse stereographic projection and thereby associate an (m+p−1)-dimensional hyper-sphere S embedded in a space V', which is higher by p dimensions than the m dimensions, with the feature space V. Note that p is an integer of 1 or greater. In the following descriptions, the inverse stereographic projection units 104a and 104b will be expressed collectively as an inverse stereographic projection unit 104, as appropriate. The inverse stereographic projection unit 104 is an example projection unit.

Figure 3:
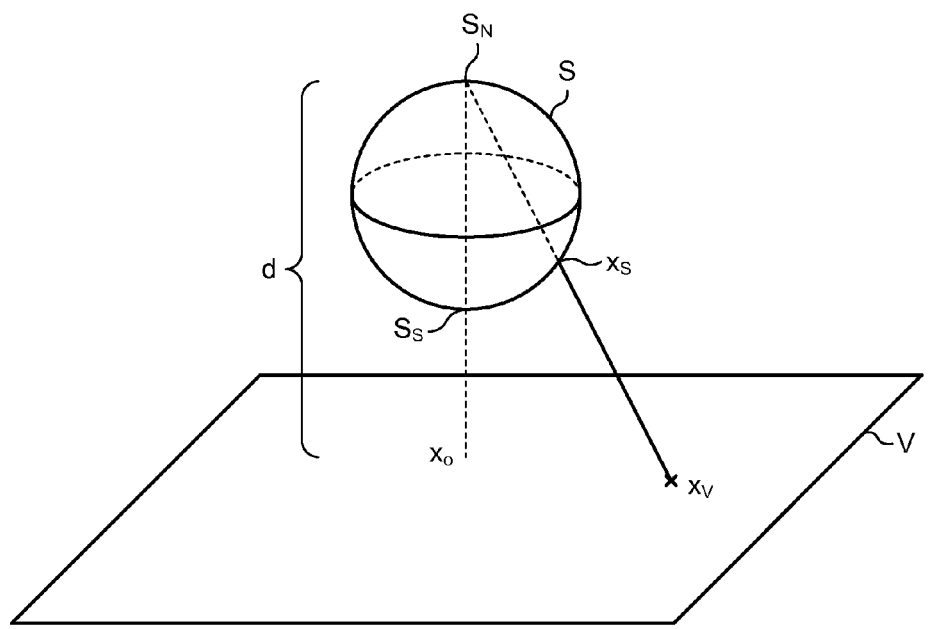
FIG. 3 is a first view illustrating the relationship between a feature space V and a hyper-sphere S.
Figure 4:
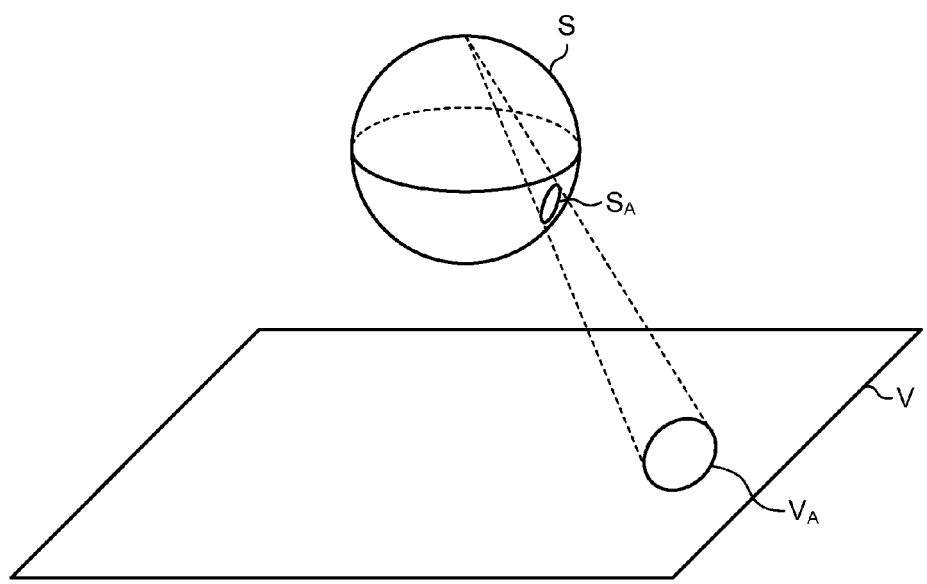
FIG. 4 is a second view illustrating the relationship between the feature space V and the hyper-sphere S.

FIGS. 3 and 4 are views illustrating the relationship between the feature space V and the hyper-sphere S. As illustrated in FIG. 3, mapping by inverse stereographic projection allows a point in the feature space V and a point on the hyper-sphere S to be associated with each other. In the example illustrated in FIG. 3, a point $x_V$ in the feature space V and a point $x_S$ on the hyper-sphere S are associated with each other. The intersection of the feature space V and the straight line connecting between the north pole $S_N$ and the south pole $S_S$ of the hyper-sphere S is defined as $x_0$. For example, the coordinates of the north pole $S_N$ are $(x_{o1}, x_{o2}, \ldots, x_{om}, 1)$ and the coordinates of the south pole $S_S$ are $(x_{o1}, x_{o2}, \ldots, x_{om}, -1)$. The height from the feature space V to the north pole $S_N$ of the hyper-sphere S is defined as d. The intersection of the surface of the hyper-sphere S and the straight line passing through the north pole $S_N$ and the point $x_V$ corresponds to $x_S$. Furthermore, for example, as illustrated in FIG. 4, the cross section $S_A$ of the hyper-sphere S corresponds to the region $V_A$ of the feature space V.

Here, the inverse stereographic projection is the inverse operation of the stereographic projection. When the hyper-sphere S and the feature space V are disposed as illustrated in FIG. 3 and a straight line is drawn from the north pole $S_N$ to intersect the hyper-sphere S, the stereographic projection is defined as the mapping from the intersection $x_S$ of the hyper-sphere S and the straight line to the intersection $x_V$ of the straight line and the feature space V. The example illustrated in FIG. 3 represents the case of the value of p being one.

Assuming that the feature vector (coordinates) of the feature space V is $(x_1, x_2, \ldots, x_m)$, let the inverse stereographic projection "$f^{-1}:V \to M$" be Expression (1). In Expression (1), $r^2$ is defined by Expression (2).

$$f^{-1}(x_1, \ldots, x_m) = \left( \frac{2d(x_1 - x_{o1})}{d^2 + r^2} + x_{o1}, \ldots, \frac{2d(x_m - x_{om})}{d^2 + r^2} + x_{om}, \frac{-d^2 + r^2}{d^2 + r^2} \right) \quad (1)$$

$$r^2 = \sum_{i=1}^{m} (x_i - x_{oi})^2 \quad (2)$$

In Expression (1) and Expression (2), $x_0$ and d are parameters. The parameters $x_0$ and d correspond to the $x_0$ and d illustrated in FIG. 3. The parameter $x_0$ is the coordinate of a point of the feature space V to be mapped to the south pole $S_S$ of the hyper-sphere S. The parameter d is a scaling parameter for the stereographic projection and equivalent to the radius of the hyper-sphere S with the equator of the hyper-sphere S mapped to the feature space V. Note that the coordinates of the equator of the hyper-sphere S is $(x_{S1}, x_{S2}, \ldots, x_{Sm}, 0)$.

The inverse stereographic projection unit 104 acquires the parameter $x_0$ and the parameter d from the parameter setting unit 108 to be described later. The inverse stereographic projection unit 104 performs the inverse stereographic projection by substituting the feature vector into Expression (1).

The inverse stereographic projection unit 104a performs the inverse stereographic projection on the basis of the feature vector stored in the query storage unit 102 and Expression (1) and then computes the coordinates on the hyper-sphere S corresponding to the feature vector. The inverse stereographic projection unit 104a outputs the resulting coordinates to the bit string generating unit 105a.

The inverse stereographic projection unit 104b performs the inverse stereographic projection on the basis of each feature vector stored in the feature value storage unit 101 and Expression (1) and then computes a plurality of coordinates on the hyper-sphere S corresponding to each feature vector. The inverse stereographic projection unit 104b outputs the plurality of resulting coordinates to the bit string generating unit 105b and the hyper-plane placement unit 106.

The bit string generating units 105a and 105b are a processing unit which converts coordinates on the hyper-sphere S into a bit string on the basis of a conversion rule. This bit string corresponds to a hash vector. In the following descriptions, the bit string generating units 105a and 105b will be collectively indicated as a bit string generating unit 105, as appropriate. The bit string generating unit 105 is an example of generating units.

The bit string generating unit 105 converts coordinates on the hyper-sphere S into a bit string on the basis of Expression (3).

$$n\left\{\begin{bmatrix} \overbrace{w_{11} \quad w_{12} \quad w_{13} \quad w_{14} \quad \ldots \quad w_{1(m+1)}}^{m+1} \\ w_{21} \quad w_{22} \quad w_{23} \quad \ldots \\ w_{31} \quad \ldots \\ \ldots \\ \ldots \quad \quad \quad \quad \quad \quad \quad w_{n(m+1)} \end{bmatrix}\begin{bmatrix} x_1 \\ x_2 \\ \vdots \\ x_m \\ x_{m+1} \end{bmatrix} + \begin{bmatrix} c_1 \\ c_2 \\ \vdots \\ c_n \end{bmatrix} = \begin{bmatrix} b_1 \\ b_2 \\ \vdots \\ b_n \end{bmatrix}\right. \quad (3)$$

In Expression (3), the information "$W_{11}, W_{12}, \ldots, W_{n(m+1)}$" of the n×(m+1) matrix and the information "$c_1, c_2, \ldots, c_n$" of n×1 are a conversion rule. The bit string generating unit 105 acquires conversion rules from the conversion rule generating unit 107 to be described later. In Expression (3), the information "$x_1, x_2, \ldots, x_{m+1}$" is coordinates on the hyper-sphere S.

The bit string generating unit 105 calculates Expression (3), thereby computing "$b_1, b_2, b_3, \ldots, b_n$". For example, the bit string generating unit 105 calculates $b_N$ as in Expression (4).

$$b_N = (W_{N1} \times x_1 + W_{N2} \times x_2 + \ldots + W_{N,m+1} \times x_{m+1}) + c_N \quad (4)$$

After having computed "$b_1, b_2, b_3, \ldots, b_n$," the bit string generating unit 105 converts $b_N$ into "1" when the value of $b_N$ is positive and converts $b_N$ into "0" when the value of $b_N$ is not positive, thereby computing the bit string. For example, when the respective values of "$b_1, b_2, b_3, \ldots, b_n$" are positive, negative, positive, ..., positive, the bit string generating unit 105 generates a bit string of "1, 0, 1, ..., 1."

The bit string generating unit 105a generates a bit string on the basis of coordinates acquired from the inverse stereographic projection unit 104a and then outputs the resulting bit string to a hamming distance generating unit 109.

The bit string generating unit 105b generates a plurality of bit strings on the basis of each set of coordinates acquired from the inverse stereographic projection unit 104b and then outputs the plurality of resulting bit strings to the bit string storage unit 103.

The hyper-plane placement unit 106 is a processing unit which disposes, to the (m+p−1)-dimensional hyper-sphere S, n hyper-planes that cross the hyper-sphere S. The hyper-plane placement unit 106 may place n hyper-planes in a random fashion or at preset positions so long as the hyper-planes cross the hyper-sphere S. The hyper-plane placement unit 106 identifies the normal vector and the offset coordinates of each hyper-plane and then outputs the information of the resulting normal vector and the information of the resulting offset coordinates to the conversion rule generating unit 107. It is assumed that the normal vectors are ($v_1, v_2, \ldots, v_n$) and the offset coordinates are ($c_1, c_2, \ldots, c_n$).

The conversion rule generating unit 107 is a processing unit which generates information on the conversion rules on the basis of the information on the normal vector and the information on the offset coordinates. The conversion rule generating unit 107 places the n normal vectors side by side, thereby generating the information "$W_{11}, W_{12}, \ldots, W_{n(m+1)}$" of the n×(m+1) matrix. For example, each row of the n×(m+1) matrix of Expression (3) corresponds to each normal vector. Note that the conversion rule generating unit 107 assigns a random value to the value of the deficient dimension of the information of the n×(m+1) matrix. Furthermore, the conversion rule generating unit 107 generates the offset coordinates as the information of n×1.

The conversion rule generating unit 107 outputs the information of the n×(m+1) matrix and the information of n×1 to the bit string generating unit 105 and the parameter setting unit 108.

The parameter setting unit 108 is a processing unit which computes the parameters $x_0$ and d. The parameter setting unit 108 is an example of search units. The parameter setting unit 108 outputs the resulting parameters $x_0$ and d to the inverse stereographic projection unit 104. Now, the processing of the parameter setting unit 108 will be specifically described.

Now, a description will be made to the processing in which the parameter setting unit 108 computes the parameter $x_0$ ($x_{01}, x_{02}, \ldots, x_{0m}$). The parameter setting unit 108 acquires each feature vector from the feature value storage unit 101 and then computes the average value μ of the feature vectors. The parameter setting unit 108 sets the average value μ to the parameter $x_0$.

Now, a description will be made to the processing in which the parameter setting unit 108 computes the parameter d. The parameter setting unit 108 acquires each feature vector from the feature value storage unit 101 and then computes the square root of the eigenvalue $\sigma_i$ of the variance-covariance matrix of each feature vector. The eigenvalue of the variance-covariance matrix indicates the degree to which a multi-dimensional feature vector is varied from the expected value. It can be thus said that the greater the value, the greater the variance. The parameter setting unit 108 identifies the maximum one of the eigenvalues $\sigma_i$ as σ. The parameter setting unit 108 sets the value of σ to the parameter d.

The parameter setting unit 108 is configured such that the greater the variance of each feature vector, the greater the value of the parameter d becomes. Thus, performing the inverse stereographic projection by the inverse stereographic projection unit 104 allows the feature vectors to be concentrated to the southern hemisphere of the hyper-sphere.

The hamming distance computing unit 109 is a processing unit which computes the hamming distance between a bit string acquired from the bit string generating unit 105a and each bit string stored in the bit string storage unit 103. The hamming distance is the number of different digits that are found when two binary numbers having the same number of digits are compared with each other. In the following descriptions, a bit string acquired from the bit string generating unit 105a is expressed as a query bit string.

The hamming distance computing unit 109 outputs the computed hamming distances between the query bit string and each bit string of the bit string storage unit 103 to the similar vector identifying unit 110.

The similar vector identifying unit 110 acquires the results of computation of the hamming distance by the hamming distance computing unit 109 and then ranks each bit string in the ascending order of the hamming distances to the query bit string. The similar vector identifying unit 110 may output upper level ones of the ranked bit strings as a bit string corresponding to a query bit string or output the results of ranking. The similar vector identifying unit 110 is an example of identifying units.

Figure 5:
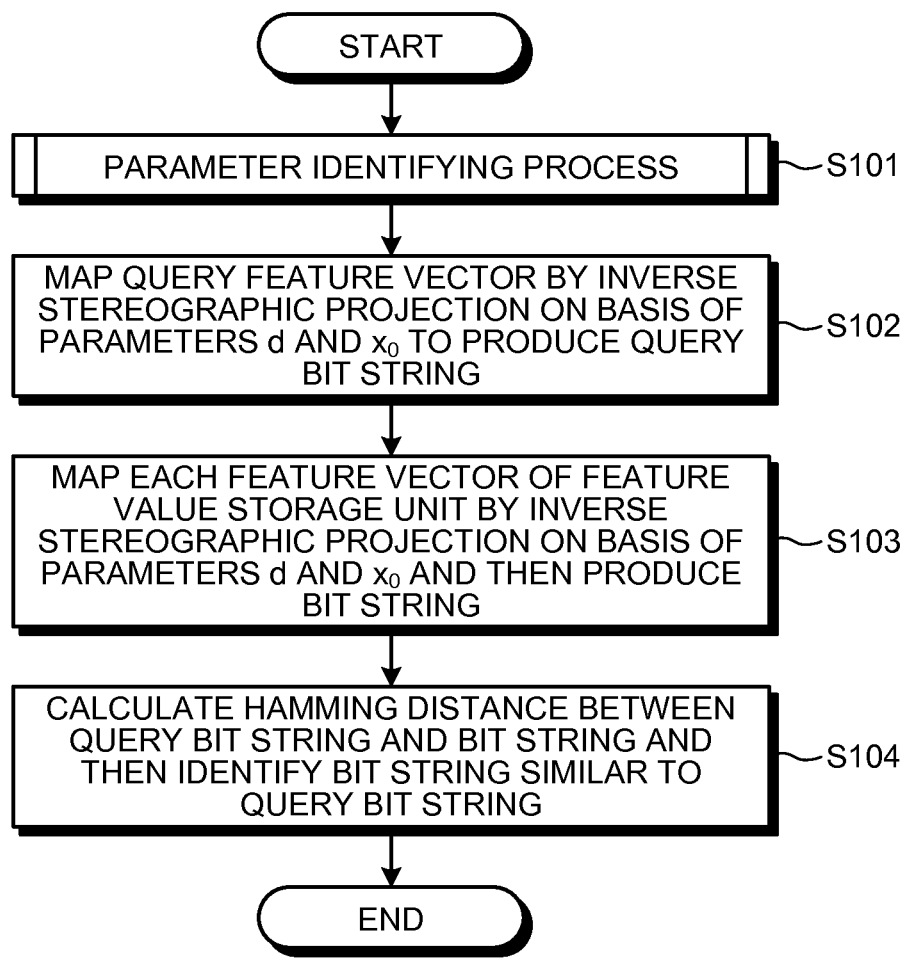
FIG. 5 is a flow chart illustrating a procedure by a search device according to the first embodiment.

Now, a description will be made to an example procedure of the search device 100 according to the first embodiment. FIG. 5 is a flow chart illustrating the procedure of the search device according to the first embodiment. As illustrated in FIG. 5, the parameter setting unit 108 of the search device 100 performs the parameter identifying process (step S101).

The inverse stereographic projection unit 104a of the search device 100 maps a query feature vector by inverse stereographic projection on the basis of the parameters d and $x_0$, and then the bit string generating unit 105a generates a query bit string (step S102).

The inverse stereographic projection unit 104b of the search device 100 maps each feature vector of the feature value storage unit 101 by inverse stereographic projection on the basis of the parameters d and $x_0$, and then the bit string generating unit 105b generates a bit string (step S103).

The hamming distance computing unit 109 of the search device 100 calculates the hamming distance between the query bit string and a bit string of the bit string storage unit 103, and then the similar vector identifying unit 110 identifies a bit string similar to the query bit string (step S104).

Now, a description will be made to the procedure of the parameter identifying process illustrated in step S101 of FIG. 5. FIG. 6 is a flow chart illustrating the procedure of the parameter identifying process according to the first embodiment. As illustrated in FIG. 6, the parameter setting unit 108 computes the average value μ of the feature vectors of the feature value storage unit 101 (step S110).

The parameter setting unit 108 computes the square root of the eigenvalue $\sigma_i$ of the variance-covariance matrices of the feature vectors and then sets the maximum one of the calculation results to σ (step S111). The parameter setting unit 108 sets the value of μ to $x_0$ (step S112). The parameter setting unit 108 sets the value of σ to d (step S113).

Now, a description will be made to the effects of the search device 100 according to the first embodiment. To map an m-dimensional feature vector by inverse stereographic projection onto the (m+p−1)-dimensional hyper-sphere and determine a bit string, the search device 100 searches for the parameters d and $x_0$ by which the feature vectors are mapped onto the southern hemisphere of the hyper-sphere. As described above, since the search device 100 determines a bit string by performing the inverse stereographic projection on the feature vectors, it is possible to reduce the amount of computation for calculating a hash vector. Furthermore, since the search device 100 performs the inverse stereographic projection using the parameters by which the feature vectors are mapped by inverse stereographic projection onto the southern hemisphere of the hyper-sphere, it is possible to compute the hamming distance between the query bit string and a bit string with accuracy while eliminating the influence of the shortcut passing through a point at infinity.

FIG. 7 is an explanatory view illustrating a shortcut of a point at infinity. When parameters are not set as in the search device 100 according to the first embodiment, points at infinity of the feature space V are projected onto one point on the north pole of the hyper-sphere S. Thus, for example, a point p that is sufficiently far away from the point $x_0$ of the feature space V and mapped by inverse stereographic projection would be associated with a point p' on the hyper-sphere S. On the other hand, the point q of the feature space V mapped by inverse stereographic projection is associated with a point q' on the hyper-sphere S. Such mapping by inverse stereographic projection would cause a shortcut to occur. For example, it may occur that a path 10a passing through the vicinity of the origin of the feature space V is shorter than a path 10b passing through the vicinity of a point at infinity. In this case, even those points that are spaced apart from each other by a distance 10c in the feature space V may be spaced apart by a shorter distance on the hyper-sphere S, thus shortening the hamming distance between the bit string of the point p and the bit string of the point q.

In contrast to this, since the search device 100 according to the first embodiment performs the inverse stereographic projection using those parameters that allow the feature vectors to be mapped by inverse stereographic projection onto the southern hemisphere of the hyper-sphere, it is possible to eliminate the influence of a shortcut passing through a point at infinity and compute the hamming distance between the query bit string and the bit string with accuracy.

In the first embodiment, the search device 100 is configured to calculate the parameters which allow the feature vector to be mapped by inverse stereographic projection onto the southern hemisphere of the hyper-sphere; however, the invention is not limited thereto. For example, the search device 100 may also compute a parameter which allows a feature vector to be mapped by inverse stereographic projection onto the eastern hemisphere of the hyper-sphere, or may also compute a parameter which allows a feature vector to be mapped by inverse stereographic projection onto the western hemisphere of the hyper-sphere.

Figure 8:
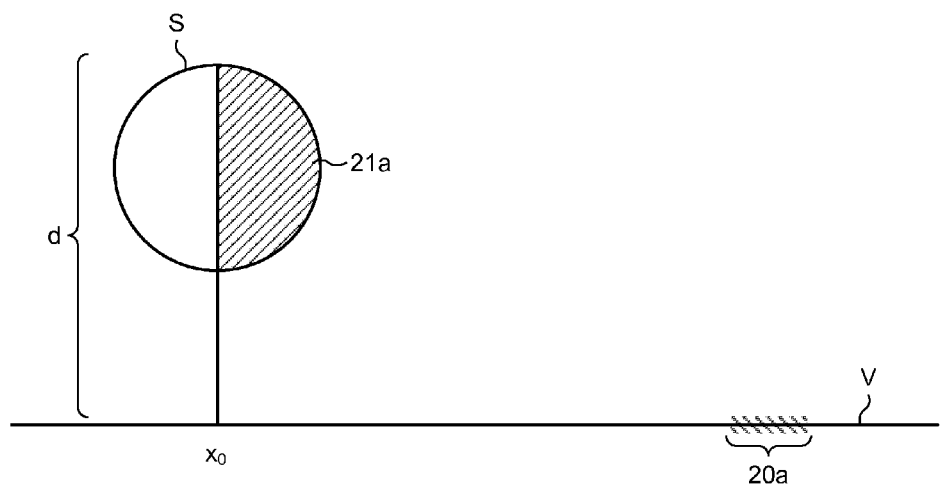
FIG. 8 is a view illustrating an example of parameters in which the feature vector is mapped by inverse stereographic projection onto the eastern hemisphere of a hyper-sphere.

FIG. 8 is a view illustrating an example parameter which allows a feature vector to be mapped by inverse stereographic projection onto the eastern hemisphere of the hyper-sphere. As illustrated in FIG. 8, when respective feature vectors are distributed in a region 20a of the feature space V, the search device 100 sets $x_0$ to the left by a predetermined distance from the average value of the region 20a. Note that the direction in which the first component is positive is assumed to be the right. The search device 100 sets $x_0$ in this manner. It is thus possible to determine parameters which allow the feature vectors to be mapped by inverse stereographic projection onto an eastern hemisphere 21a of the hyper-sphere. Note that the parameter d can be determined by performing the same processing as the parameter setting unit 108 does.

Figure 9:
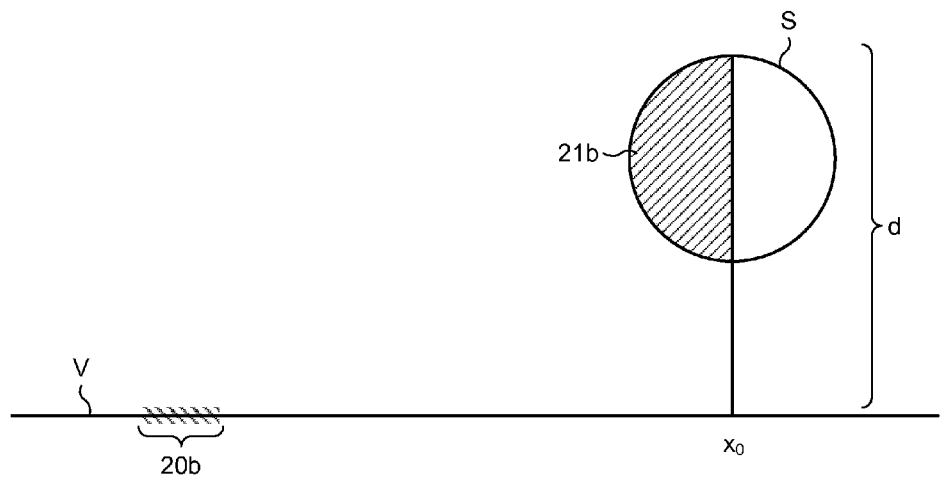
FIG. 9 is a view illustrating an example of parameters in which the feature vector is mapped by inverse stereographic projection onto the western hemisphere of the hyper-sphere.

FIG. 9 is a view illustrating an example parameter which allows the feature vector to be mapped by inverse stereographic projection onto the western hemisphere of the hyper-sphere. As illustrated in FIG. 9, when respective feature vectors are distributed in a region 20b of the feature space V, the search device 100 sets $x_0$ to the right by a predetermined distance from the average value of the region 20b. The search device 100 sets $x_0$ in this manner. It is thus possible to determine a parameter which allows the feature vectors to be mapped by inverse stereographic projection onto a western hemisphere 21b of the hyper-sphere. Note that the parameter d can be determined by performing the same processing as the parameter setting unit 108 does.

[b] Second Embodiment

Figure 10:
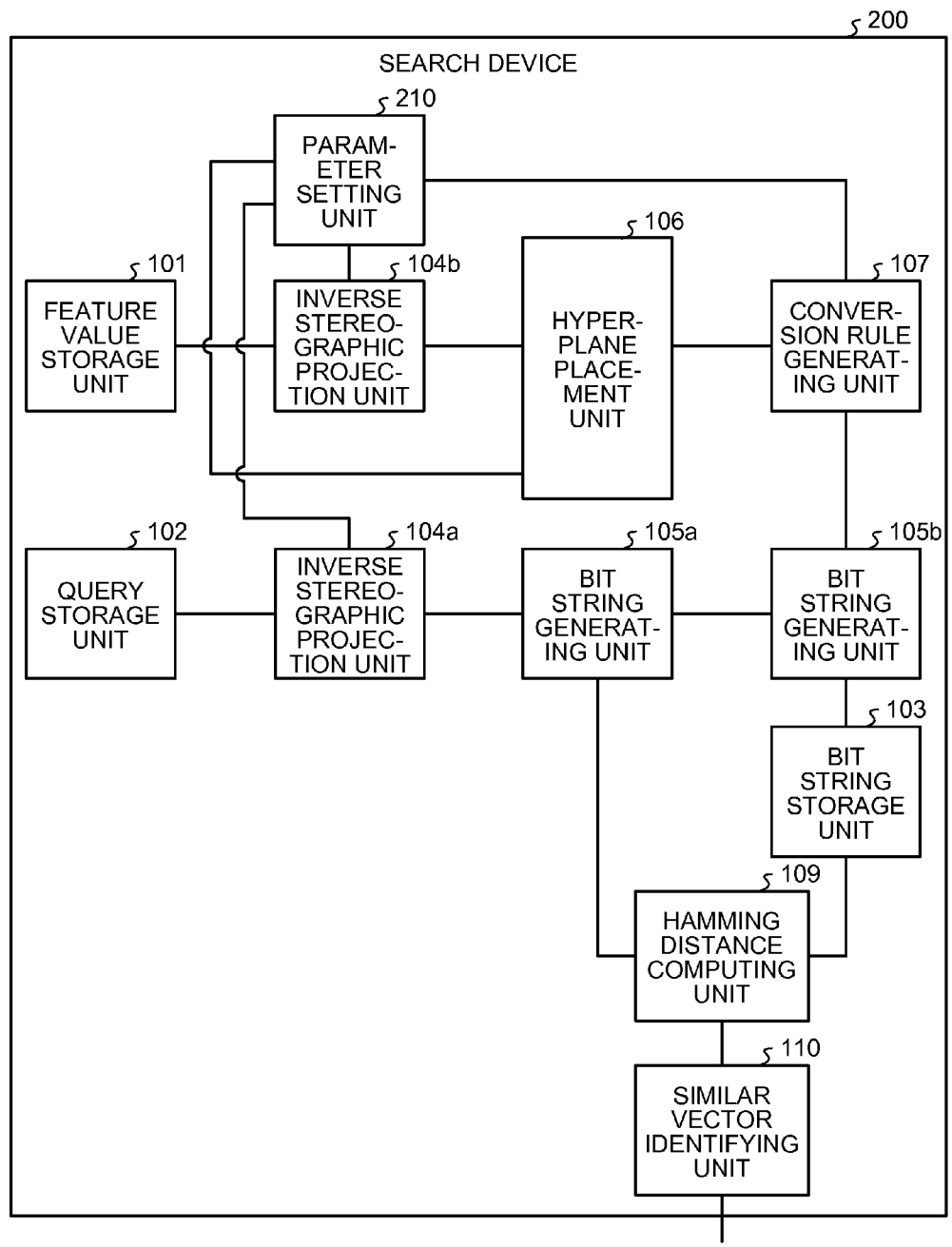
FIG. 10 is a functional block diagram illustrating a configuration of a search device according to a second embodiment.

Now, a description will be made to an example configuration of a search device according to a second embodiment. FIG. 10 is a functional block diagram illustrating a configuration of the search device according to the second embodiment. As illustrated in FIG. 10, a search device 200 includes the feature value storage unit 101, the query storage unit 102, the bit string storage unit 103, the inverse stereographic projection units 104a and 104b, and the bit string generating units 105a and 105b. The search device 100 also includes the hyper-plane placement unit 106, the conversion rule generating unit 107, the hamming distance computing unit 109, the similar vector identifying unit 110, and a parameter setting unit 210.

Among the processing units illustrated in FIG. 10, the feature value storage unit 101, the query storage unit 102, the bit string storage unit 103, the inverse stereographic projection units 104a and 104b, and the bit string generating units 105a and 105b can be described in the same manner as the respective corresponding processing units illustrated in FIG. 1 is and will thus be indicated by the same symbols without being repeatedly explained. Furthermore, among the processing units illustrated in FIG. 10, the hyper-plane placement unit 106, the conversion rule generating unit 107, the hamming distance computing unit 109, and the similar vector identifying unit 110 can be described in the same manner as the respective corresponding processing units illustrated in FIG. 1 is and will thus not be repeatedly explained.

The parameter setting unit 210 is a processing unit which computes the parameters $x_0$ and d. The parameter setting unit 210 outputs the resulting parameters $x_0$ and d to the inverse stereographic projection unit 104. The processing of the parameter setting unit 210 will be specifically described below.

Now, a description will be made to the processing in which the parameter setting unit 210 computes the parameter $x_0$ ($x_{01}$, $x_{02}$, . . . ,). The parameter setting unit 210 acquires each feature vector from the feature value storage unit 101 and then computes the average value μ of the feature vectors. The parameter setting unit 210 sets the average value μ to the parameter $x_0$.

Now, a description will be made to the processing in which the parameter setting unit 210 computes the parameter d. The parameter setting unit 210 acquires each feature vector from the feature value storage unit 101 and then computes the square root of the eigenvalue $\sigma_i$ of the variance-covariance matrix of each feature vector. The parameter setting unit 210 identifies the maximum one of the eigenvalues $\sigma_i$ as σ.

The parameter setting unit 210 performs the principal component analysis on the feature vector and computes the cumulative contribution ratio. For example, the parameter setting unit 210 performs the principal component analysis so as to determine the spread of the principal component of each dimension. The parameter setting unit 210 sorts the spreads of the principal component of each dimension in descending order of magnitude of the spreads so as to obtain $\sigma_1, \sigma_2, \ldots, \sigma_N$. The parameter setting unit 210 computes λ on the basis of Expression (5). Furthermore, the parameter setting unit 210 computes a cumulative contribution ratio $\lambda_m$ on the basis of Expression (6).

$$\lambda = \sum_{i=1}^{N} \sigma_i \quad (5)$$

$$\lambda_m = \sum_{i=1}^{m} \frac{\sigma_i}{\lambda} \quad (6)$$

Figure 11:
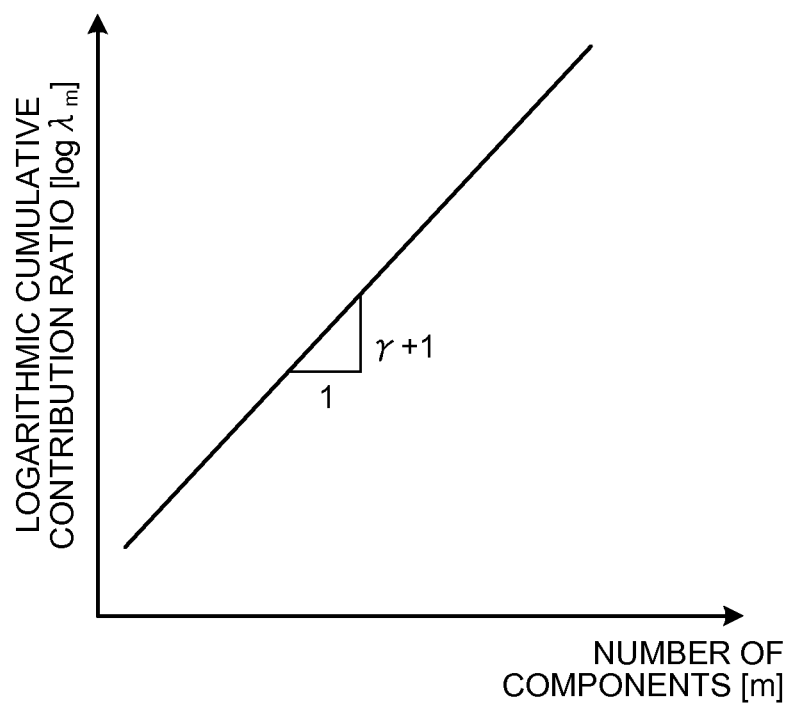
FIG. 11 is a view illustrating an example of an approximate straight line.

The parameter setting unit 210 plots the relationship between "m" and "log $\lambda_m$" in the graph with the horizontal axis representing the number of components "m" and the vertical axis representing the logarithmic cumulative contribution ratio "log λm," and then identifies an approximate straight line on the basis of the plotted result. For example, the parameter setting unit 210 identifies the approximate straight line, for example, by the least squares method. FIG. 11 is a view illustrating an example of an approximate straight line. The parameter setting unit 210 computes the gradient of the approximate straight line as "γ+1." Then, the parameter setting unit 210 computes Expression (7), thereby computing the parameter d.

$$d=\sigma/(\gamma+1) \quad (7)$$

Now, a description will be made to the procedure of the search device 200 according to the second embodiment. The procedure of the search device 200 is the same as the procedure illustrated in FIG. 5. The search device 200 is configured such that the contents of the parameter identifying process are different from those of the parameter identifying process of the first embodiment, and thus a description will now be made to the procedure of the parameter identifying process according to the second embodiment.

Figure 12:
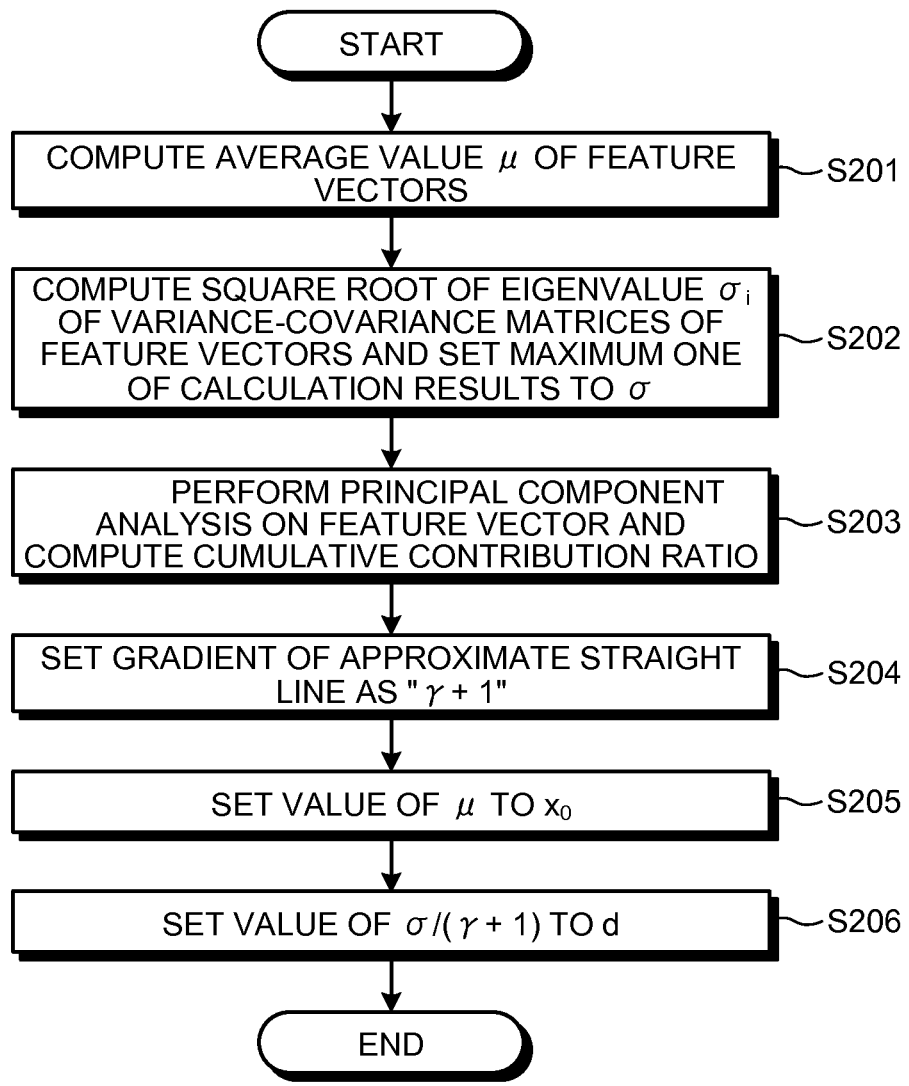
FIG. 12 is a flow chart illustrating the procedure of a parameter identifying process according to the second embodiment.

FIG. 12 is a flow chart illustrating the procedure of the parameter identifying process according to the second embodiment. As illustrated in FIG. 12, the parameter setting unit 210 computes the average value μ of the feature vectors of the feature value storage unit 101 (step S201).

The parameter setting unit 210 computes the square root of the eigenvalue σi of the variance-covariance matrices of the feature vectors and sets the maximum value to σ (step S202). The parameter setting unit 210 performs the principal component analysis on the feature vectors and computes the cumulative contribution ratio (step S203).

The parameter setting unit 210 sets the gradient of the approximate straight line to "γ+1" (step S204). The parameter setting unit 210 sets the value of μ to $x_0$ (step S205). The parameter setting unit 210 sets the value of σ/(γ+1) to d (step S206).

Now, a description will be made to the effects of the search device 200 according to the second embodiment. The search device 200 sets the gradient of the cumulative contribution ratio curve to "γ+1," and then computes the parameter d on the basis of the resulting "γ+1" and the value of the variance-covariance matrix. The inverse stereographic projection using the parameter d associates the feature vector with the southern hemisphere of the hyper-sphere. It is thus possible to eliminate the influence of a shortcut passing through a point at infinity and compute the hamming distance between the query bit string and the bit string with accuracy.

[c] Third Embodiment

Figure 13:
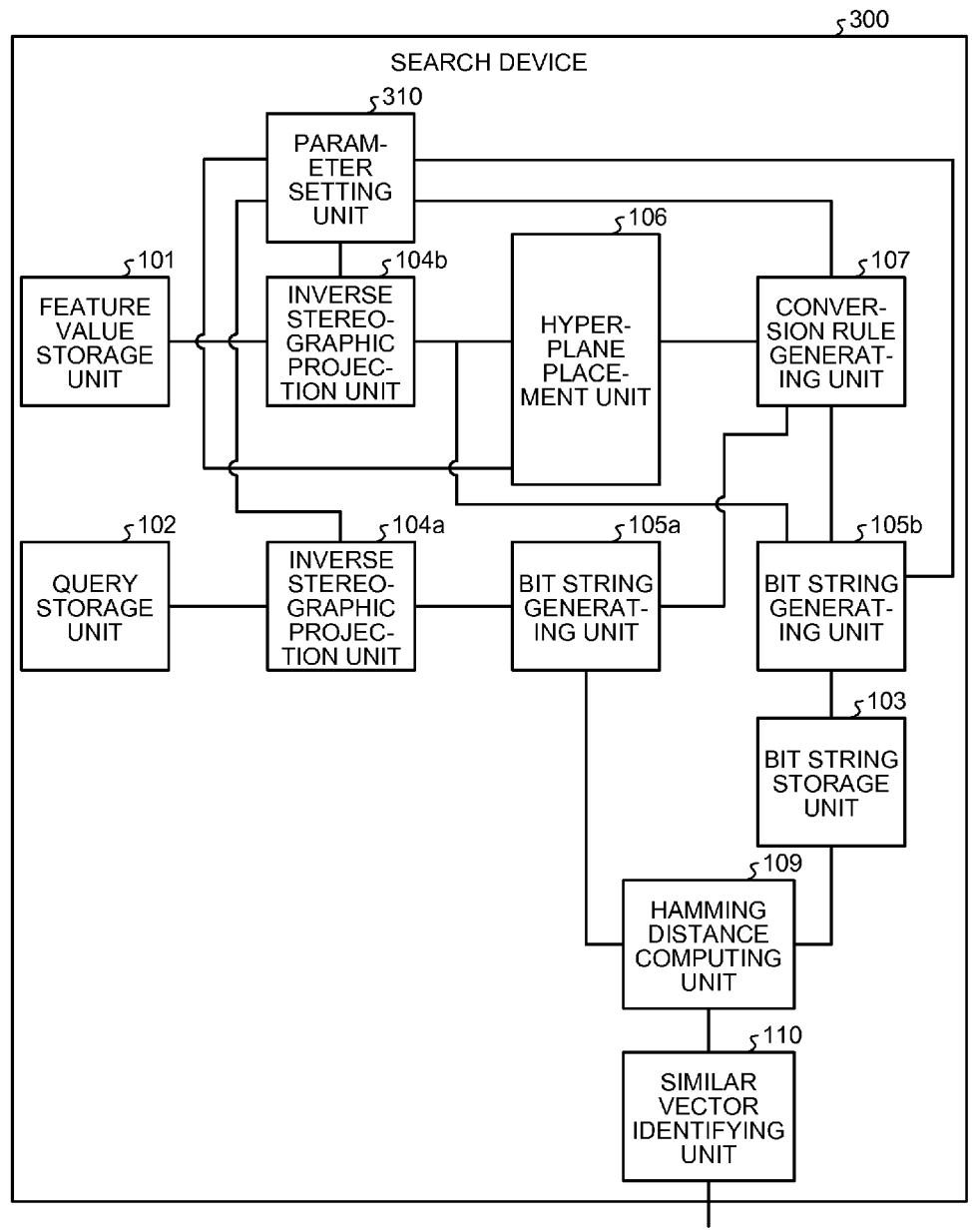
FIG. 13 is a functional block diagram illustrating a configuration of a search device according to a third embodiment.

Now, a description will be made to an example configuration of a search device according to a third embodiment. FIG. 13 is a functional block diagram illustrating a configuration of the search device according to the third embodiment. As illustrated in FIG. 13, a search device 300 includes the feature value storage unit 101, the query storage unit 102, the bit string storage unit 103, the inverse stereographic projection units 104a and 104b, and the bit string generating units 105a and 105b. The search device 100 also includes the hyper-plane placement unit 106, the conversion rule generating unit 107, the hamming distance computing unit 109, the similar vector identifying unit 110, and a parameter setting unit 310.

Among the processing units illustrated in FIG. 13, the feature value storage unit 101, the query storage unit 102, the bit string storage unit 103, the inverse stereographic projection units 104a and 104b, and the bit string generating units 105a and 105b can be described in the same manner as the respective corresponding processing units illustrated in FIG. 1 and will thus be indicated by the same symbols without being repeatedly explained. Furthermore, among the processing units illustrated in FIG. 13, the hyper-plane placement unit 106, the conversion rule generating unit 107, the hamming distance computing unit 109, and the similar vector identifying unit 110 can be described in the same manner as the respective corresponding processing units illustrated in FIG. 1 and will thus not be repeatedly explained.

The parameter setting unit 310 is a processing unit which computes the parameters $x_0$ and d. The parameter setting unit 310 outputs the resulting parameters $x_0$ and d to the inverse stereographic projection unit 104. The parameter setting unit 310 according to the third embodiment computes the parameters $x_0$ and d using one of the hill-climbing search, the Markov Chain Monte Carlo method, and the swarm intelligence.

Now, a description will be made to an example of the processing in which the parameter setting unit 310 identifies the parameters $x_0$ and d by "the hill-climbing search." The parameter setting unit 310 identifies the initial values of the parameters $x_0$ and d, and acquires the bit string of each feature vector computed by the initial values from the bit string generating unit 105b. The parameter setting unit 310 identifies the initial values of the parameters $x_0$ and d, for example, in the same manner as the parameter setting unit 108 illustrated in the first embodiment does. The parameter setting unit 310 performs the approximate similarity search on the basis of each feature vector and the bit string so as to calculate the accuracy of approximation. For example, the approximation accuracy is computed by Expression (8).

$$\frac{|R_k \cap Q_k|}{|R_k|} \quad (8)$$

Now, a description will be made to an example of the processing for computing the approximation accuracy. For example, the parameter setting unit 310 selects a feature vector $v_a$ from the feature value storage unit 101 and then identifies the feature vectors of the first place to the mth place which have the shortest distance to the feature vector $v_a$ in the feature space. The feature vectors which have the shortest distance to the feature vector $v_a$ in the feature space are assumed to be feature vectors $v_{a1}$ to $v_{aM}$. For example, in Expression (8), the number M of the feature vectors corresponds to $|R_k|$.

The parameter setting unit 310 identifies the bit strings of the first place to the mth place which have the shortest distance to the bit string corresponding to the feature vector $v_a$ from the bit string generating unit 105b, and then identifies the feature vectors $v_{b1}$ to $v_{bM}$ corresponding to the identified bit strings. For example, the parameter setting unit 310 may associate the bit string and the feature vector with each other on the basis of the identification information. The parameter setting unit 310 counts how many feature vectors among the feature vectors $v_{b1}$ to $v_{bM}$ are the same as the feature vectors $v_{a1}$ to $v_{aM}$. This counted number corresponds to the $|R_k \cap Q_k|$ of Expression (8).

The parameter setting unit 310 computes the initial parameters $x_0$ and d; sets close values to the parameters $x_0$ and d for output to the inverse stereographic projection unit 104b; and computes the approximation accuracy for the close values. The parameter setting unit 310 repeatedly performs the processing above and identifies the parameters $x_0$ and d that have the highest approximation accuracy.

The hamming distance computing unit 109 calculates the hamming distance on the basis of the bit string calculated by the parameters $x_0$ and d having the highest approximation accuracy identified by the parameter setting unit 310.

Subsequently, a description will be made to an example of the processing in which the parameter setting unit 310 identifies the parameters $x_0$ and d by "the Markov Chain Monte Carlo method." The parameter setting unit 310 identifies the first parameters $x_0$ and d and then acquires, from the bit string generating unit 105b, the bit string of each feature vector computed by the first parameters $x_0$ and d. For example, the parameter setting unit 310 identifies the initial values of the first parameters $x_0$ and d in the same manner as the parameter setting unit 108 illustrated in the first embodiment does. The parameter setting unit 310 performs an approximate similarity search on the basis of each feature vector and the bit string and calculates the approximation accuracy X1 of the first parameters. For example, the approximation accuracy is computed by Expression (8) in the same manner as the hill-climbing search.

The parameter setting unit 310 sets the close values of the first parameters $x_0$ and d as the second parameters $x_0$ and d. The parameter setting unit 310 acquires the bit string of each feature vector computed based on the second parameters $x_0$ and d from the bit string generating unit 105b. The parameter setting unit 310 performs an approximate similarity search on the basis of each feature vector and the bit string so as to calculate the approximation accuracy X2 of the second parameters.

The parameter setting unit 310 generates a random number, and when the value of the random number is less than X2/X1, sets the second parameters $x_0$ and d to the first parameters $x_0$ and d. Furthermore, the parameter setting unit 310 sets the close values of the first parameters $x_0$ and d to the second parameters $x_0$ and d and then repeatedly performs the aforementioned processing.

On the other hand, when the value of the random number generated is not less than X2/X1, the parameter setting unit 310 leaves the first parameters $x_0$ and d unchanged. Furthermore, the parameter setting unit 310 sets the new close values of the first parameters $x_0$ and d to the second parameters $x_0$ and d and then repeatedly performs the aforementioned processing.

Using the final first parameters $x_0$ and d obtained by the parameter setting unit 310 repeating the aforementioned processing a predetermined number of times, the hamming distance computing unit 109 calculates the hamming distance.

Subsequently, a description will be made to an example of the processing in which the parameter setting unit 310 identifies the parameters $x_0$ and d by "the swarm intelligence." The parameter setting unit 310 identifies a plurality of parameters $x_0$ and d. For example, the parameter setting unit 310 determines the parameters $x_0$ and d in the same manner as the parameter setting unit 108 illustrated in the first embodiment does, and as well determines a plurality of close values of the parameters $x_0$ and d, thereby identifying a plurality of parameters $x_0$ and d.

The parameter setting unit 310 acquires, from the bit string generating unit 105b, the bit string of each feature vector computed by the plurality of parameters $x_0$ and d. The parameter setting unit 310 regards each set of parameters $x_0$ and d as the position of a charged particle and uses an objective function to perform a charged system search, thereby identifying the parameters $x_0$ and d that have the highest approximation accuracy.

The parameters $x_0$ and d are regarded as the position of a charged particle. It is thus possible to provide a restriction for preventing each set of parameters $x_0$ and d from nearing each other when each set of parameters $x_0$ and d is displaced. It is then possible, for each position of the charged particles, to identify the parameters $x_0$ and d that provide the highest approximation accuracy at positions spaced apart by a predetermined distance. Among the parameters $x_0$ and d which are identified for each charged particle as providing the maximum approximation accuracy, the parameter setting unit 310 identifies the parameters $x_0$ and d that provide the maximum approximation accuracy. The hamming distance computing unit 109 employs such parameters to calculate the hamming distance.

Note that the objective function for the charged system search computes the approximation accuracy when the parameters $x_0$ and d are given. The contents of the processing for computing the approximation accuracy are the same as those for the hill-climbing search and the Markov Chain Monte Carlo method which are mentioned above.

Now, a description will be made to the procedure of the search device 300 according to the third embodiment. The procedure of the search device 300 is the same as the procedure illustrated in FIG. 5. Since the search device 300 is configured such that the contents of the parameter identifying process are different from those of the parameter identifying process of the first embodiment, a description will now be made to the procedure of the parameter identifying process according to the third embodiment. As the parameter identifying process, descriptions will be made below to the parameter identifying process by the hill-climbing search, the parameter identifying process by the Markov Chain Monte Carlo method, and then the parameter identifying process by the swarm intelligence, in that order.

Figure 14:
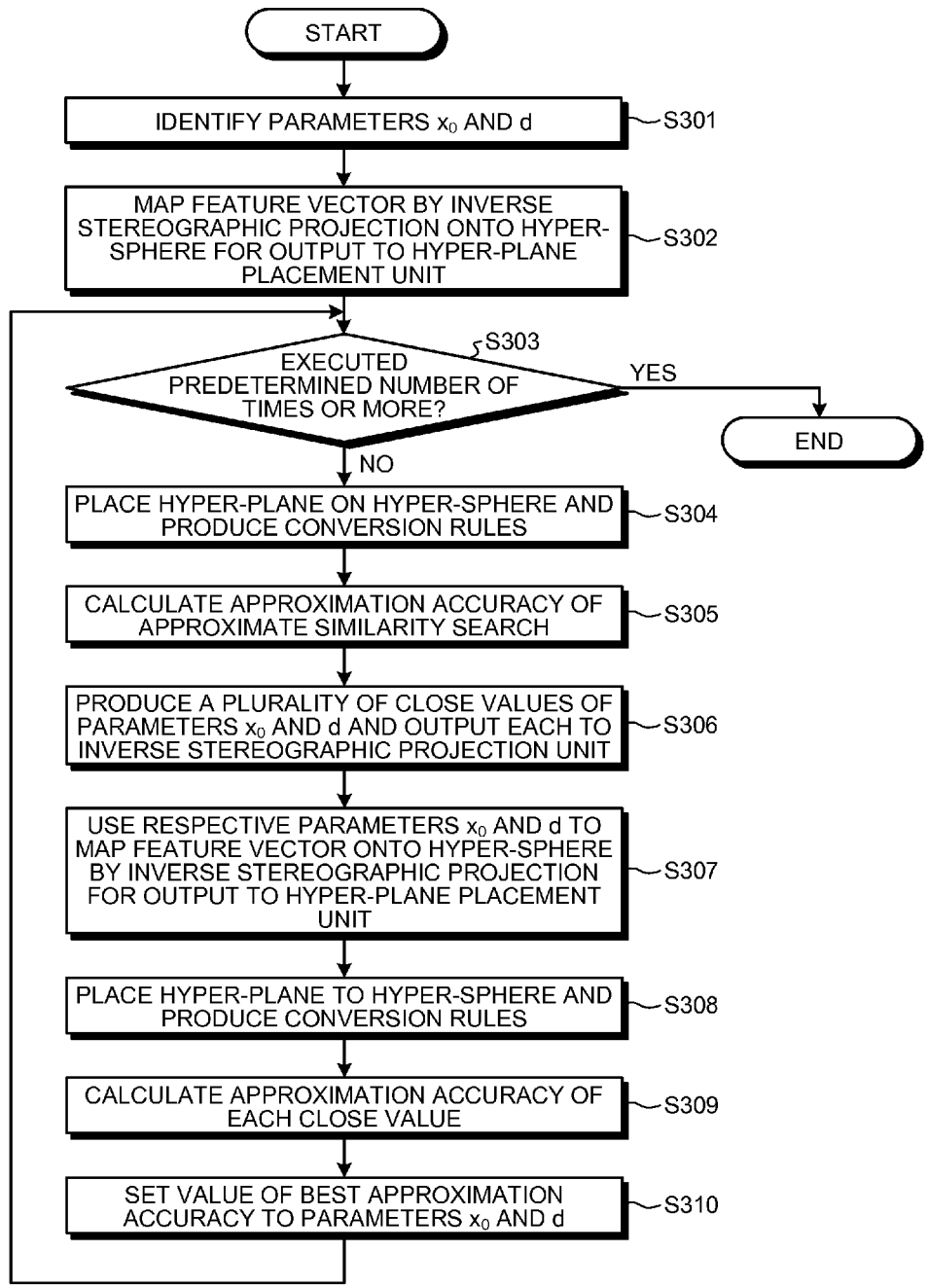
FIG. 14 is a flow chart illustrating the procedure of a parameter identifying process by the hill-climbing search.

First, a description will be made to an example of the procedure of the parameter identifying process by the hill-climbing search. FIG. 14 is a flow chart illustrating the procedure of the parameter identifying process by the hill-climbing search. As illustrated in FIG. 14, the parameter setting unit 310 of the search device 300 identifies the parameters $x_0$ and d (step S301). The inverse stereographic projection unit 104 maps the feature vector to the hyper-sphere by inverse stereographic projection and then outputs the results to the hyper-plane placement unit 106 (step S302).

When having repeated the processing a predetermined number of times (Yes in step S303), the search device 300 exits the parameter identifying process. On the other hand, when not having repeated the processing a predetermined number of times (No in step S303), the search device 300 proceeds to step S304.

The hyper-plane placement unit 106 places hyper-planes on the hyper-sphere and the conversion rule generating unit 107 generates conversion rules (step S304). The parameter setting unit 310 calculates the approximation accuracy of the approximate similarity search (step S305).

The parameter setting unit 310 produces a plurality of close values of the parameters d and $x_0$ and then outputs each to the inverse stereographic projection unit 104b (step S306). The inverse stereographic projection unit 104b uses each set of parameters d and $x_0$ to map the feature vectors onto the hyper-sphere by inverse stereographic projection for output to the hyper-plane placement unit 106 (step S307).

The hyper-plane placement unit 106 places hyper-planes onto the hyper-sphere and generates conversion rules (step S308). The parameter setting unit 310 acquires a bit string from the bit string generating unit 105b and then calculates the approximation accuracy of each close value (step S309). The parameter setting unit 310 sets the value that provides the best approximation accuracy to the parameters d and $x_0$ (step S310), and then proceeds to step S303.

Figure 15:
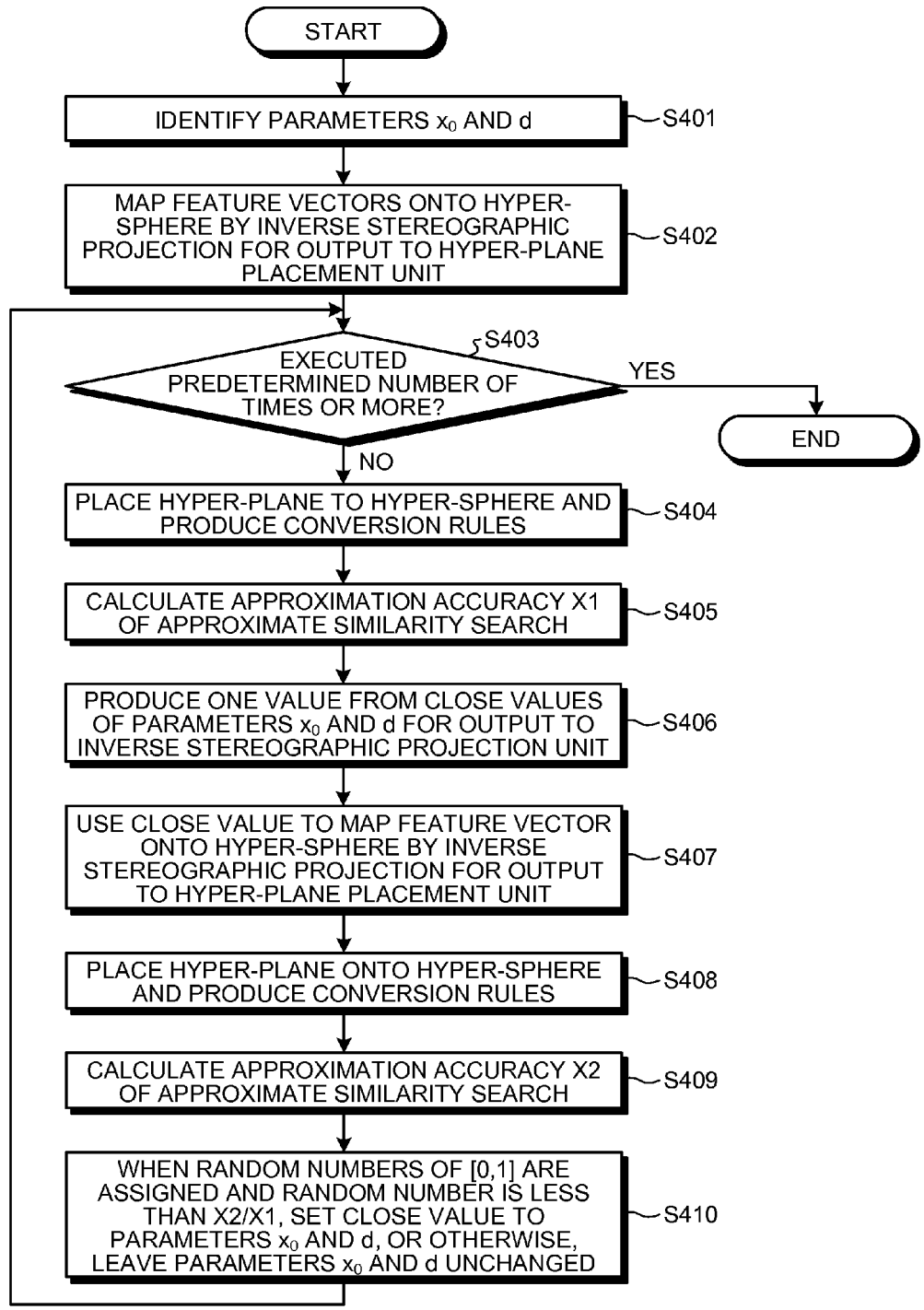
FIG. 15 is a flow chart illustrating the procedure of a parameter identifying process by the Markov Chain Monte Carlo method.

Now, a description will be made to an example of the procedure of the parameter identifying process by the Markov Chain Monte Carlo method. FIG. 15 is a flow chart illustrating the procedure of the parameter identifying process by the Markov Chain Monte Carlo method.

As illustrated in FIG. 15, the parameter setting unit 310 of the search device 300 identifies the parameters $x_0$ and d (step S401). The inverse stereographic projection unit 104 maps the feature vector onto the hyper-sphere by inverse stereographic projection and then outputs the results to the hyper-plane placement unit 106 (step S402).

When having repeated the processing a predetermined number of times (Yes in step S403), the search device 300 exits the parameter identifying process. On the other hand, when not having repeated the processing a predetermined number of times (No in step S403), the search device 300 proceeds to step S404.

The hyper-plane placement unit 106 places hyper-planes onto the hyper-sphere, and the conversion rule generating unit 107 generates conversion rules (step S404). The parameter setting unit 310 calculates the approximation accuracy of the approximate similarity search (step S405).

The parameter setting unit 310 calculates the approximation accuracy X1 of the approximate similarity search (step S405). The parameter setting unit 310 generates one set of close values of the parameters $x_0$ and d for output to the inverse stereographic projection unit 104b (step S406).

The inverse stereographic projection unit 104b employs the close values to map the feature vector onto the hyper-sphere by inverse stereographic projection for output to the hyper-plane placement unit 106 (step S407). The hyper-plane placement unit 106 places hyper-planes onto the hyper-sphere and generates conversion rules (step S408). The parameter setting unit 310 acquires a bit string from the bit string generating unit 105b and calculates the approximation accuracy X2 of the close value (step S409).

The parameter setting unit 310 assigns a random number of [0, 1] and then sets the close value to the parameters $x_0$ and d when the random number is less than X2/X1, or otherwise, leaves the parameters $x_0$ and d unchanged (step S410) and then proceeds to step S403.

Figure 16:
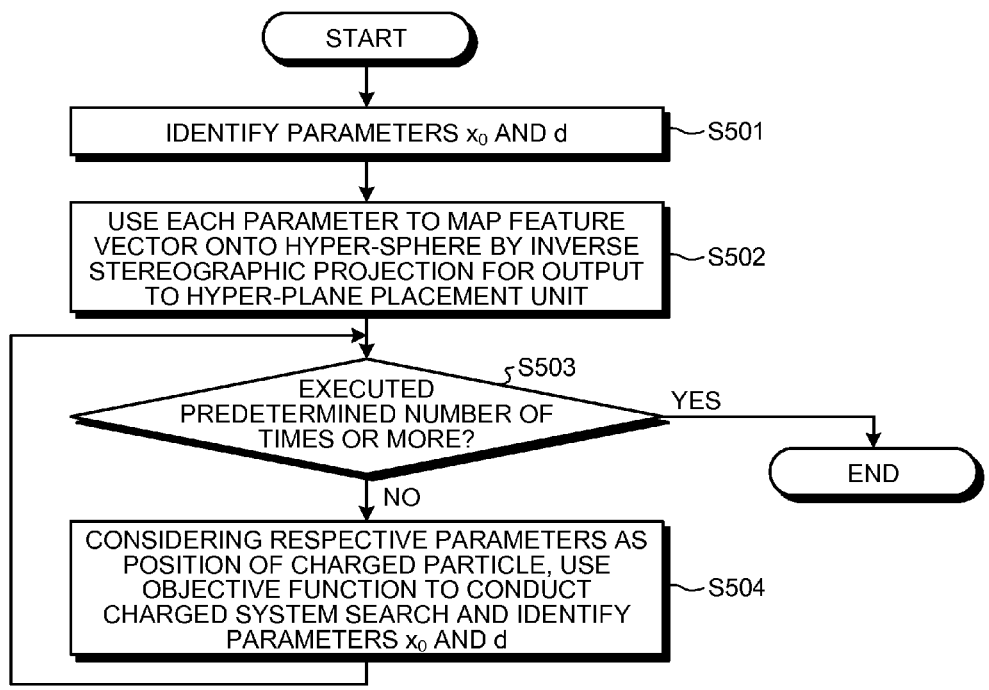
FIG. 16 is a flow chart illustrating the procedure of a parameter identifying process by the swarm intelligence.

Now, a description will be made to an example of the procedure of the parameter identifying process by the swarm intelligence. FIG. 16 is a flow chart illustrating the procedure of the parameter identifying process by the swarm intelligence.

As illustrated in FIG. 16, the parameter setting unit 310 of the search device 300 identifies the parameters $x_0$ and d (step S501). The inverse stereographic projection unit 104 maps the feature vector by inverse stereographic projection onto the hyper-sphere and outputs the results to the hyper-plane placement unit 106 (step S502).

When having repeated the processing a predetermined number of times (Yes in step S503), the search device 300 exits the parameter identifying process. On the other hand, when not having repeated the processing a predetermined number of times (No in step S503), the search device 300 proceeds to step S504.

The parameter setting unit 310 regards each set of parameters as the position of a charged particle; performs the charged system search using an objective function to identify the parameters $x_0$ and d (step S504); and then proceeds to step S503.

Figure 17:
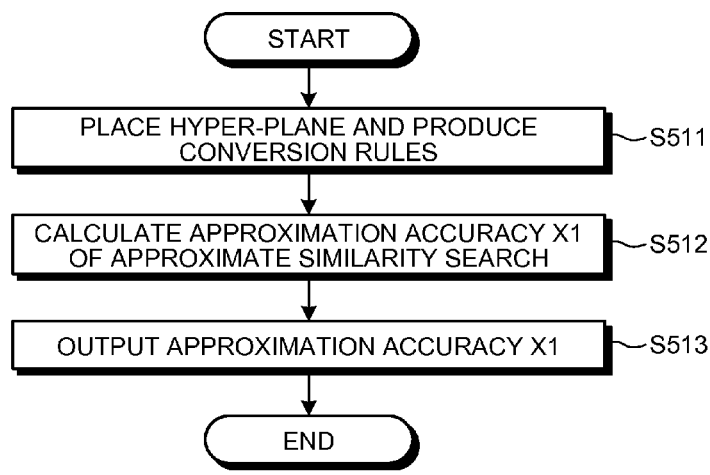
FIG. 17 is a flow chart illustrating an example of the procedure of an objective function.

Now, a description will be made to an example of the procedure of the objective function illustrated in 5504 of FIG. 16. FIG. 17 is a flow chart illustrating an example of the procedure of the objective function.

As illustrated in FIG. 17, the hyper-plane placement unit 106 of the search device 300 places hyper-planes, and the conversion rule generating unit 107 generates conversion rules (step S511). The parameter setting unit 310 calculates the approximation accuracy X1 of the approximate similarity search (step S512), and outputs the approximation accuracy X1 (step S513).

Now, a description will be made to the effects of the search device 300 according to the third embodiment. The search device 300 employs the hill-climbing search, the Markov Chain Monte Carlo method, and the swarm intelligence in order to identify the parameters $x_0$ and d, and thus can efficiently identify the optimum parameters $x_0$ and d.

In the aforementioned embodiments, the description was made to the cases where mapping by inverse stereographic projection is performed on the hyper-sphere S present in a space that is higher by one dimension than the feature space V. However, the invention is not limited thereto. The present invention is also applicable in the same manner, for example, even when mapping by inverse stereographic projection is performed on an m-dimensional sphere present in a space that is higher by two or more dimensions than the feature space V.

Figure 18:
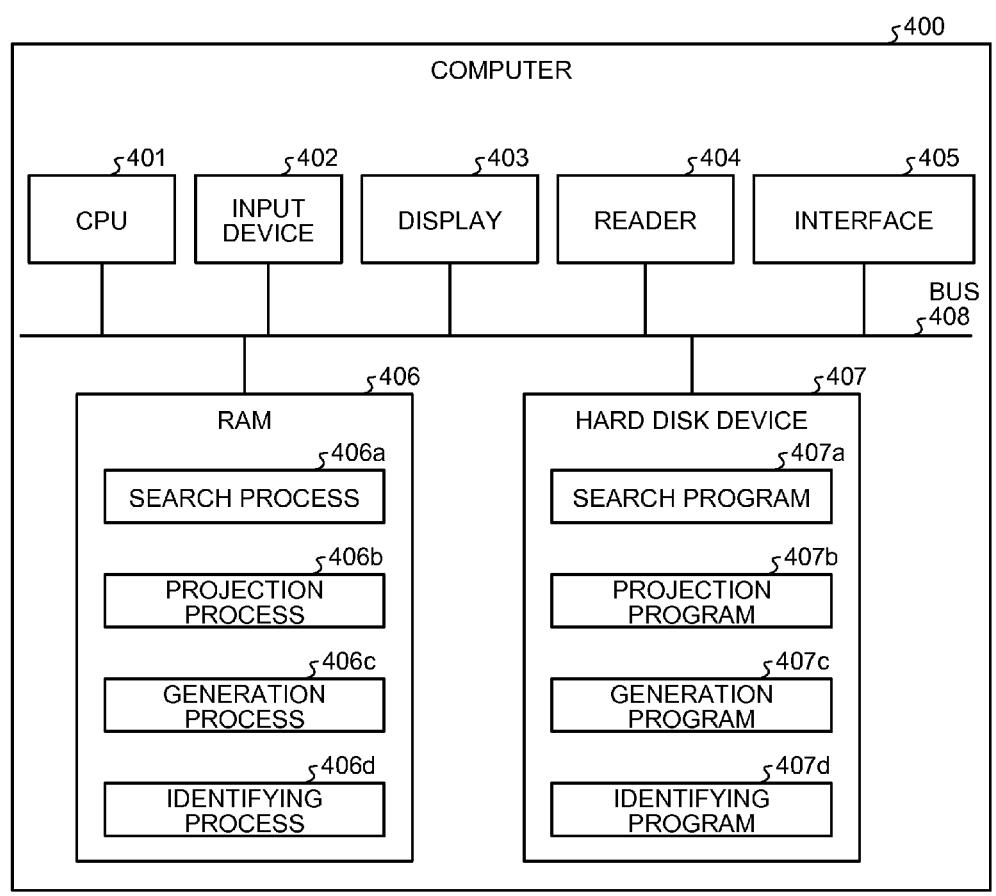
FIG. 18 is a view illustrating an example of a computer for executing a search program.

Now, a description will be made to an example of a computer for operating an image processing apparatus which achieves the same function as that of the search device illustrated in the aforementioned embodiments. FIG. 18 is a view illustrating an example of a computer for executing a search program.

As illustrated in FIG. 18, a computer 400 includes a CPU 401 for performing various types of computing, an input device 402 for receiving data entered by a user, and a display 403. The computer 400 also includes a reader 404 for reading programs or the like from a storage medium, and an interface 405 for transmitting and receiving data to and from another computer through a network. The computer 400 further includes a RAM 406 for temporarily storing various types of information and a hard disk device 407. The respective devices 401 to 407 are connected to a bus 408.

The hard disk 407 includes a search program 407a, a projection program 407b, a generation program 407c, and an identifying program 407d. The CPU 401 reads each of the programs 407a to 407d and then expands the same on the RAM 406.

The search program 407a serves as a search process 406a. The projection program 407b serves as a projection process 406b. The generation program 407c serves as a generation process 406c. The identifying program 407d serves as an identifying process 406d.

For example, the search process 406a corresponds to the parameter setting unit 108. The projection process 406b corresponds to the inverse stereographic projection unit 104. The generation process 406c corresponds to the bit string generating unit 105. The identifying process 406d corresponds to the similar vector identifying unit 110.

Note that each of the programs 407a to 407d do not always have to be stored in the hard disk 407 from the beginning. For example, each program may be stored in a "portable physical medium" such as a flexible disk (FD), CD-ROM, DVD disk, magneto-optical disc, and IC card which are to be inserted into the computer 400. Then, the computer 400 may read each of the programs 407a to 407d therefrom to execute the same.

An embodiment of the present invention produces an effect of being capable of performing a similarity search in a simple manner using a hyper-sphere.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A search method to be performed by a computer, the search method comprising:
   acquiring a first-dimensional feature vector stored in a database;
   searching for parameters by which a position of the first-dimensional feature vector to be mapped onto a surface of a sphere is concentrated onto a hemisphere of the sphere when the first-dimensional feature vector is mapped onto the surface of the sphere on the basis of the parameters including an intersection and a distance, the intersection at which a feature space and a straight line passing through the sphere present in a space greater in dimension by one or more than the feature space intersect, the distance being from a predetermined point of the sphere to the feature space;
   mapping a plurality of feature vectors onto the surface of the sphere by the parameters found by the searching;
   generating bit strings of the feature vectors from a relationship between the position of the mapped feature vectors and a plurality of hyper-planes dividing the sphere; and
   determining a similar feature vector on the basis of the generated bit strings.

2. The search method according to claim 1, wherein the computer searches for the parameters which allow the positions of the feature vectors mapped onto the surface of the sphere to be concentrated on a southern hemisphere, an eastern hemisphere, or a western hemisphere of the sphere.

3. The search method according to claim 1, wherein the computer searches for the parameters on the basis of an average value of the feature vectors and a maximum value of eigenvalues of variance-covariance matrices of the feature vectors.

4. The search method according to claim 1, wherein the computer identifies a cumulative contribution ratio curve on the basis of a principal component analysis result of the plurality of feature vectors and searches for the parameters on the basis of the cumulative contribution ratio curve.

5. The search method according to claim 1, wherein the computer searches for parameters on the basis of a hill-climbing method, a Markov Chain Monte Carlo method, or swarm intelligence.

6. A non-transitory computer-readable recording medium having stored therein a search program for causing a computer to execute a process including:
acquiring a first-dimensional feature vector stored in a database;
searching for parameters by which a position of the first-dimensional feature vector to be mapped onto a surface of a sphere is concentrated onto a hemisphere of the sphere when the first-dimensional feature vector is mapped onto the surface of the sphere on the basis of the parameters including an intersection and a distance, the intersection at which a feature space and a straight line passing through the sphere present in a space greater in dimension by one or more than the feature space intersect, the distance being from a predetermined point of the sphere to the feature space;
mapping a plurality of feature vectors onto the surface of the sphere by the parameters found by the searching;
generating bit strings of the feature vectors from a relationship between the position of the mapped feature vectors and a plurality of hyper-planes dividing the sphere; and
determining a similar feature vector on the basis of the generated bit strings.

7. The non-transitory computer readable recording medium according to claim 6, wherein the computer executes the process for searching for the parameters which allow the positions of the feature vectors mapped onto the surface of the sphere to be concentrated on a southern hemisphere, an eastern hemisphere, or a western hemisphere of the sphere.

8. The non-transitory computer readable recording medium according to claim 6, wherein the computer executes the process for searching for the parameters on the basis of an average value of the plurality of feature vectors and a maximum value of eigenvalues of variance-covariance matrices of the feature vectors.

9. The non-transitory computer readable recording medium according to claim 6, wherein the computer executes the process for searching for the parameters on the basis of a hill-climbing method, a Markov Chain Monte Carlo method, or swarm intelligence.

10. A search device comprising:
a memory; and
a processor coupled to the memory, wherein the processor executes a process comprising:
acquiring a first-dimensional feature vector stored in a database;
searching for parameters by which a position of the first-dimensional feature vector to be mapped onto a surface of a sphere is concentrated onto a hemisphere of the sphere when the first-dimensional feature vector is mapped onto the surface of the sphere on the basis of the parameters including an intersection and a distance, the intersection at which a feature space and a straight line passing through the sphere present in a space greater in dimension by one or more than the feature space intersect, the distance being from a predetermined point of the sphere to the feature space;
mapping a plurality of feature vectors onto the surface of the sphere by the parameters found by the searching;
generating bit strings of the feature vectors from a relationship between the position of the mapped feature vectors and a plurality of hyper-planes dividing the sphere; and
determining a similar feature vector on the basis of the generated bit strings.

11. The search device according to claim 10, wherein the processor executes the process for searching for the parameters which allow the positions of the feature vectors mapped onto the surface of the sphere to be concentrated on a southern hemisphere, an eastern hemisphere, or a western hemisphere of the sphere.

12. The search device according to claim 10, wherein the processor executes the process for searching for the parameters on the basis of an average value of the feature vectors and a maximum value of eigenvalues of variance-covariance matrices of the feature vectors.

13. The search device according to claim 10, wherein the processor executes the process including identifying a cumulative contribution ratio curve on the basis of a principal component analysis result of the plurality of feature vectors and searches for parameters on the basis of the cumulative contribution ratio curve.

14. The search device according to claim 10, wherein the processor executes the process including identifying a cumulative contribution ratio curve on the basis of a principal component analysis result of the first dimensional feature vector and searches for parameters on the basis of the cumulative contribution ratio curve.

15. The search device according to claim 10, wherein the processor executes the process for searching for the parameters on the basis of a hill-climbing method, a Markov Chain Monte Carlo, or swarm intelligence.

16. The non-transitory computer readable recording medium according to claim 6, wherein the computer executes the process for identifying a cumulative contribution ratio curve on the basis of a principal component analysis result of the plurality of feature vectors and searches for parameters on the basis of the cumulative contribution ratio curve.

* * * * *